United States Patent [19]
Yanagisawa

[11] Patent Number: 5,018,149
[45] Date of Patent: May 21, 1991

[54] FREE ELECTRON LASER OSCILLATOR

[75] Inventor: Yutaro Yanagisawa, Hamamatsu, Japan

[73] Assignee: Hamamatsu Photonics K.K., Hamamatsu, Japan

[21] Appl. No.: 479,243

[22] Filed: Feb. 13, 1990

[30] Foreign Application Priority Data

Feb. 13, 1989 [JP] Japan .................................. 1-33368

[51] Int. Cl.$^5$ ............................................. H01S 3/00
[52] U.S. Cl. ..................................................... 372/2
[58] Field of Search ........................................... 372/2

[56] References Cited

PUBLICATIONS

Fraser et al., "High-Brightness Photoemitter Injector For Electron Accelerators", IEEE Transactions on Nuclear Science, vol. NS-32, No. 5, Oct. 1985, pp. 1791-1793.

Boussoukaya et al., "Pulsed Photocurrents Form Lanthanum Hexaboride Cathodes In The ns Regime", Nuclear Instruments and Methods in Physics Research A264 (1988) 131-134, North-Holland, Amsterdam, pp. 131-134.

Boussoukaya et al., "High Quantum Yield From Photofield Emitters", Nuclear Instruments and Methods in Physics Research A279 (1989) 405-409.

Primary Examiner—Léon Scott, Jr.
Attorney, Agent, or Firm—Cushman, Darby & Cushman

[57] ABSTRACT

In a free-electron laser oscillator, two laser beams having different wavelengths are irradiated to a photoemitter to generate an electron beam. The electron beam is density-modulated by a frequency corresponding to a difference between frequencies of the two laser beams, and accelerated to a vicinity of light velocity by a microwave. Such a relative theory electron beam is directed into a periodical magnetic field generated by a helical wigglar and a track thereof is deflected. As a result, a synchrotron radiation light is generated from the relative theory electron beam. The radiation light generates an electromagnetic field by itself. Thus, electromagnetic interaction takes place among the electromagnetic field, the periodical magnetic field and the relative theory electron beam, and the laser oscillation is started. A power of the laser beam irradiated to the photoemitter may be reduced because the two laser beams having different wavelengths are irradiated to the photoemitter and the electron beam is bunched in accordance with the difference between frequencies.

5 Claims, 3 Drawing Sheets

FREE ELECTRON LASER OSCILLATOR

BACKGROUND OF THE INVENTION

1. Field of Invention

The present invention relates to a free-electron laser (FEL) oscillator which uses an electron beam as a laser medium, particularly for one having an electron beam source constructed by a photoemitter.

2. Related Background Art

The free-electron laser oscillator usually uses the electron beam as the laser medium to attain a laser oscillation by mutual action of the electron beam and an externally applied electric field, magnetic field or laser beam. High current, high brightness and long life of the free-electron source or the electron beam source is desired. Where a linear accelerator is used to accelerate the electron beam, the use of the photoemitter as the electron beam source has been considered in order to produce a bunched beam which conforms to a frequency of a microwave applied to the accelerator. For example, the use of the photoemitter as the electron beam source is discussed in "High-Brightness Photoemitter Injector for Electron Accelerators" by J. S. Fraser et al, IEEE Transactions on Nuclear Science, Vol. NS-32, No. 5 October 1985, and "Pulsed Photocurrents From Lanthanum Hexaboride Cathodes in the ns Regime" by M. Moussoukay et al, Nuclear Instruments and Methods in Physics Research A264 (1988) 131–134, North-Holland Amsterdam.

A principle of operation of the FEL oscillator is explained in detail in "Wiggler and Free Election Laser" by J-Kondo, Study Report No. 200, Electro-Technical Research Lab. AIST, MITI, Japan May 1979. According to the article, the conventional FEL oscillator is constructed as described below. A laser beam from a mode locked YAG laser is reflected by a mirror and directed to a photoemitter in a cavity through a window. Since a target of the photoemitter is made of a material having a photoelectron emitting property such as cecium-antimony, photoelectrons are emitted by the application of the laser beam and the emitted photoelectrons are accelerated by a voltage applied across the photoemitter and an acceleration electrode. The relative theory electron beam which has been accelerated to a vicinity of light velocity by the microwave accelerator has a track thereof changed by a magnetic field generated by a deflection coil and is directed to a periodical magnetic field generated by a helical wiggler.

The laser beam used in the FEL oscillator to emit the photoelectrons is a laser beam having a pulse train of a given duration. It is a pulsed laser beam having a pulse train of 350 pico-seconds (ps) or 770 ps duration which is generated by mode locking in accordance with the period of the microwave used to accelerate the electron beam. As a result, a pulse train of the electron beam corresponding to the pulse train of the laser beam, that is, a bunched electron beam generated from the photoemitter is accelerated by the microwave to become the relative theory electron beam which is close to the light velocity. A method for generating the bunched electron beam is described in "High Quantum Yield from Photofield Emitters" by M. Boussoukaya et al, Nuclear Instruments and Methods in Physics Research A279 (1989) 405–409 North-Holland Amsterdam. When the relative theory electron beam thus generated is directed to the periodic magnetic field generated by the helical wiggler, the track of the electrons is deflected by the periodical magnetic field so that a synchrotron radiation light is generated. Since the synchrotron radiation light interacts with the electrons to generate an electromagnetic field and the electrons interact with the periodic magnetic field, a laser oscillation which uses the free-electrons as a laser medium is started.

The conventional FEL oscillation is generated by a secondary effect of the mutual action of the relative theory electron beam, the periodic magnetic field and the synchrotron radiation light. Accordingly, a high oscillation gain is not attained. In order to attain a high free-electron laser beam output, it has been proposed to use a high brightness electron beam source which permits a high current output of, for example, 50 to 100 A/cm$^2$. However, in the electron beam source which uses the photoemitter, the damage of the photoemitter is high because a power of the mode locked laser beam irradiated to emit the photoelectrons is high. Accordingly, the lifetime of the photoemitter is reduced to one to several days.

The conventional free-electron laser oscillator uses a condition that the quantity of emission of the synchrotron radiation light from the electrons which are in a deceleration phase in the periodic magnetic field slightly exceeds the quantity of absorption of the light by the electrons which are in an acceleration phase in the same periodic magnetic field, that is, it utilizes the secondary effect of the laser oscillation. Accordingly, if the wavelength of the oscillation laser beam is reduced to attain a high energy, the oscillation gain will further decrease. As a result, the scale of the device of the free-electron laser oscillator for generating the short wavelength laser beam increase.

It is, therefore, a first object of the present invention to provide a free-electron laser oscillator which allows a long life of an electron emission material which forms a target of an electron beam source and assures a high oscillation gain, and an oscillation method therefore.

It is a second object of the present invention to provide a free-electron laser oscillator which allows reduction of the size of the device.

SUMMARY OF THE INVENTION

The free-electron laser oscillator of the present invention comprises a laser beam source for emitting two laser beams having different wavelengths, an electron beam source including electron emission means for emitting electrons by the irradiation of the two laser beams, an electron beam source for emitting an electron beam having an electron density modulated in accordance with a difference between the frequencies of the two laser beams, and laser oscillation means for effecting the laser oscillation at the same wavelength as the modulation while utilizing the electron beam as a laser medium.

The method for oscillating the free-electron laser of the present invention comprises a first step of irradiating two laser beams having different wavelengths to electron emission means to generate an electron beam having an electron density modulated in accordance with a difference between the frequencies of the two laser beams, a second step of accelerating the electron beam to a vicinity of light velocity to generate a relativity theory electron beam, and a third step of directing the relativity theory electron beam into a periodic magnetic field to generate the laser oscillation at the same wavelength as the density modulation wavelength of the electron beam.

In accordance with the features of the present invention, the electron beam, which is density-modulated in accordance with the frequency difference, is in generated without significantly damaging the target by irradiating the two laser beams having different wavelengths on the electron emission material which forms the electron beam source. The electron beam is then oscillated by the primary effect of the mutual action while utilizing the electron beam as the laser medium so that the laser oscillation at the same wavelength as the density modulation wavelength of the electron beam is attained with a high gain.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
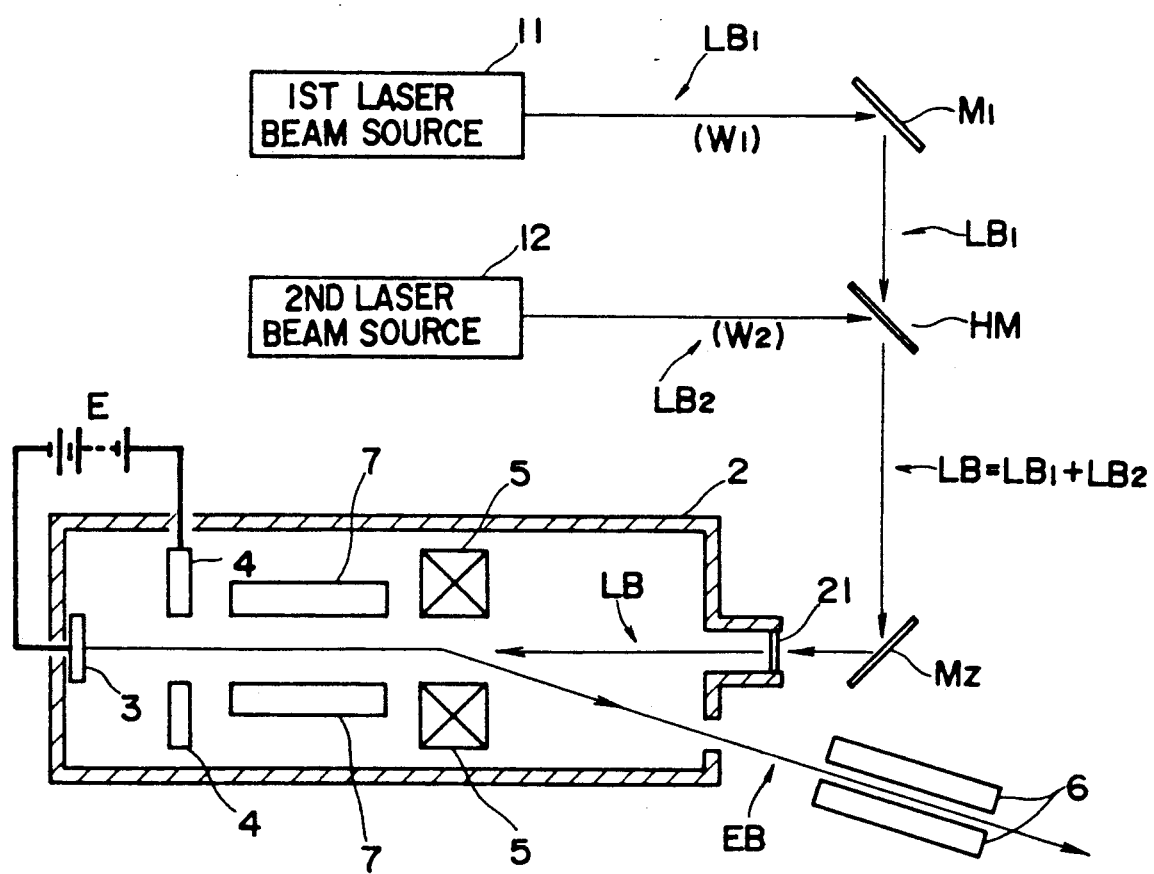
FIG. 1 shows a configuration of a free-electron laser oscillator in accordance with one embodiment of the present invention.

In a free-electron laser oscillator in accordance with one embodiment of the present invention shown in FIG. 1, two laser beam sources having different oscillation wavelengths from each other are provided. A first laser beam source 11 for generating a first laser beam $LB_1$ having an angular frequency $\omega_1$, and a second laser beam source 12 for generating a second laser beam $LB_2$ having an angular frequency $\omega_2 = \omega_1 + \Delta\omega$ are combined to form a laser beam source for emitting photoelectrons. The first laser beam $LB_1$ is reflected by a total reflection mirror M1 and passes through a half-mirror HM. On the other hand, the second laser beam $LB_2$ is reflected by the half-mirror HM. The first laser beam $LB_1$ and the second laser beam $LB_2$ are combined into a single laser beam LB by the actions of the mirrors $M_1$ and HM. The laser beam $LB = LB_1 + LB_2$ is reflected by another total reflection mirror $M_2$ and directed to a cavity 2, having the inside thereof being a vacuum, through a light transmissive window 21. The laser beam LB is directed to a photoemitter 3 having a target which is formed by a photoelectron emission material.

When the laser beam LB comprising the first laser beam $LB_1$ and the second laser beam $LB_2$, which have different wavelengths, is directed to the photoemitter 3, an electron beam EB which is density-modulated in accordance with a difference between the frequencies of the two laser beams is produced and it is accelerated by an acceleration voltage E applied across the photoemitter 3 and an acceleration electrode 4. The accelerated electrons are guided into a microwave accelerator 7 where they are accelerated to a velocity in the vicinity of the velocity of light. The relativity theory electron beam EB accelerated near the velocity of light has a track thereof deflected by a deflection coil 5 and is directed to a periodic magnetic field generated by a laser oscillation magnet 6 which may comprise an undulator and a helical wigglar.

The period of the magnetic field generated by the laser oscillation magnet 6 is set such that the density modulation wavelength of the relative theory electron beam EB and the oscillation wavelength of the free-electron laser are equal to each other. As a result, the mutual action of the electron beam EB, the magnetic field caused by the laser oscillation magnet 6 and the synchrotron radiation light is very large, and the laser oscillation with a high gain is attained by the primary effect. Since it is sufficient for the electron beam source to generate the density-modulated electron beam EB, a photoelectron emission source or photoemitter of a low current type may be used. When the two laser beams are irradiated on the photoemitter, the powers thereof need not be high. Accordingly, the photoemitter is not damaged.

With reference to the brief explanation described above, the embodiment of the present invention is now explained in more detail.

In FIG. 1, the first laser beam $LB_1$ and the second laser beam $LB_2$ are expressed by $$E_1 = E_{10} \cdot \cos(\omega_1 \cdot t + \phi_1)$$

$$E_2 = E_{20} \cdot \cos(\omega_2 \cdot t + \phi_1) \qquad (1)$$

The photoelectron current I produced from the photoemitter 3 by the irradiation of the laser beam LB is expressed by $$I \propto E_1^2 + E_2^2 + 2E_1 E_2 \cos\{(\omega_1 - \omega_2)t + \phi_1 - \phi_2\} \qquad (2)$$

Assuming that the wavelength of the first laser beam $LB_1$ having the angular frequency $\omega_1$ is 400 to 600 nanometers (nm), and the angular frequency of the second laser beam $LB_2$ is $\omega_2 = \omega_1 + \Delta\omega$, the photoelectron current I is density-modulated by the angular frequency $\Delta\omega$. For example, if $\omega_1/\Delta\omega = 2$ to 200, the frequency of the electron density modulation corresponds to the light wavelength of 1 to 100 micrometers ($\mu$m).

Figure 2:
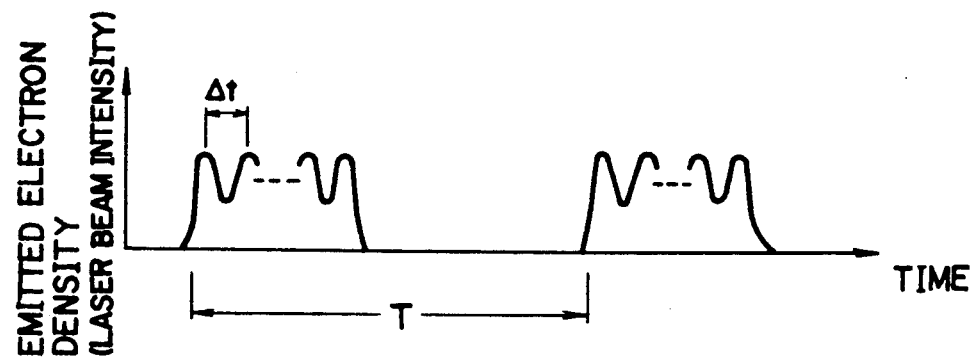
FIGS. 2A, 2B and 2C show distributions of photoelectron density.
Figure 2:
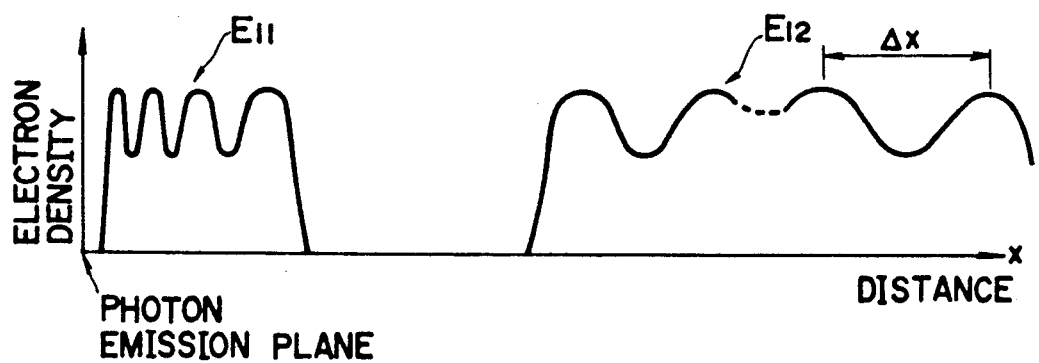
Figure 2:

The electron beam EB from the photoemitter 3 is accelerated by the microwave accelerator 7. In order to render the electron beam EB to a bunched electron beam which is in synchronism with the acceleration microwave applied to the microwave accelerator 7 and which has the same wavelength as the acceleration microwave, the laser beam sources 11 and 12 may use mode locked YAG laser oscillators. When both the first laser beam $LB_1$ and the second laser beam $LB_2$ are mode-locked, the laser intensity and the emitted electron density on the photoelectron emission plane of the photoemitter 3 are controlled as shown in FIG. 2A, in which T corresponds to the period of the acceleration microwave. In an S band, the duration T = 350 ps, and in an L band, the duration T = 770 ps. In FIG. 2A, $\Delta t$ corresponds to the angular frequency difference $\Delta\omega = \omega_2 - \omega_1$, and $\Delta t = 2\pi/\Delta\omega$.

Figure 3:
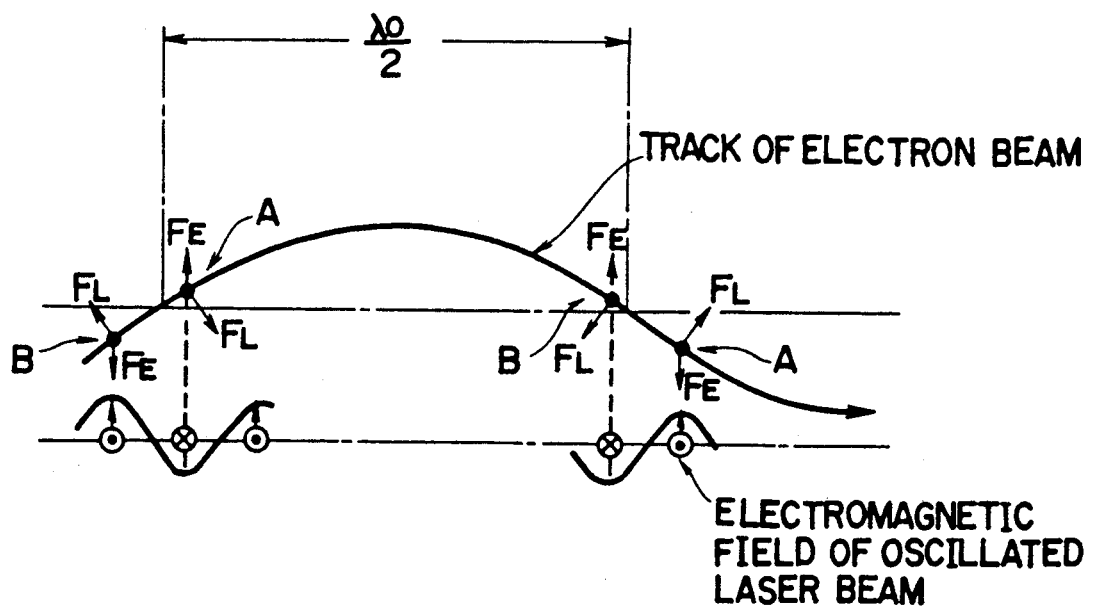
FIG. 3 illustrates a principle of operation of the free-electron laser oscillator.

When the relative theory electron beam EB is directed into the periodic magnetic field having the period $\lambda_0$, the free-electron laser oscillation is attained in a manner shown in FIG. 3. An upper curve in FIG. 3 shows the electron beam EB which has a track thereof deflected by the periodic magnetic field generated by the laser oscillation magnet 6 and travels helically, and a lower curve shows an electromagnetic field of the synchrotron radiation light generated by the relativity theory electron beam EB. When the electron beam EB shown in FIG. 3 satisfies a resonance condition of a formula (3), it interacts with the periodic magnetic field and the synchrotron radiation light and receives a force $F_E$ due to the electric field and a force $F_L$ due to the magnetic field.

At points A and B, confirmed directions of the forces $F_E$ and $F_L$ which each electron of the electron beam EB receives are opposite to each other along the direction of travel of the relativity theory electron beam EB which is close to the velocity of light. Accordingly, at the point A which is in an acceleration phase, the electrons are continuously accelerated to absorb the light, and at the point B which is in a deceleration phase, the electrons are continuously decelerated to emit the light.

$$\text{Resonance condition; } \lambda_0 = L_a \cdot (1+k^2)/2\gamma^2 \quad (3)$$

where $\lambda_0$ is the laser oscillation wavelength and $\lambda_0 \omega_0 = 2\pi c$ where c is the light velocity, $L_a$ is a distance between magnets of the undulator which generates the periodic magnetic field, k is a constant and $k \approx 1$, and $\gamma$ is a Lawlentz factor of electron.

If the density distribution of the electron beam EB is uniform in the order of wavelength of the oscillated laser beam, the absorption and the emission of the light are substantially equal to each other at the time when the electron beam EB is directed to the periodical magnetic field, and as the result, no free-electron laser oscillation is attained. However, when the electron beam EB interacts with the periodic magnetic field, the electron beam EB is gradually density-modulated. When the energy of the electron beam EB is slightly higher than the resonance condition, the number of electrons which are in the deceleration phase is larger than the number of electrons which are in the acceleration phase and as a result, laser oscillation is attained.

The laser oscillation gain G is expressed by $$G = G_{os} - \alpha \cdot G_{ab} \quad (4)$$

where $\alpha$ is a ratio of the number of electrons which are in the light absorption phase (point A) to the number of electrons which are in the oscillation phase (point B), and $G_{os}$ and $G_{ab}$ are terms of oscillation and light absorption, respectively. The gain G is more specifically expressed by $$G \approx A \cdot I[g(\omega_0/\omega_- - 1) - \alpha \cdot g(\omega_0/\omega_+ - 1)] \quad (5)$$

Where A is a constant, I is a photoelectron density, the function g is $g(X) = (N\pi^2)^{-1}\{\sin^2 N\pi x/x^2\}$, and $\omega_\pm$ is $$\omega_\pm = \omega_0\{1 \pm (\hbar\omega_0)/(\gamma mc^2)\}.$$

Accordingly, $\omega_\pm$ is divided into the first term and the second term of the formula (5). Since the second term $(\hbar\omega_0)/(\gamma mc_2) <$ the first term $\omega_0$, the function g is developed to obtain the laser oscillation gain G $$G \approx B \cdot I\{(1-\alpha) + (\hbar\omega_0)/(\gamma mc^2)\} \quad (6)$$

where B is a constant.

Where the electron beam EB is not density-modulated, $\alpha = 1$ in formula (6) and the gain G is obtained from only the second term of formula (6). The second term of formula (6) is (energy of the oscillated laser beam)/(energy of electron beam EB). Specifically, assuming that $\gamma mc^2$ is 10 to 100 mega electron volts (MeV) and $\hbar\omega_0$ is 0.1 to several eV, the gain G amounts to only the order of $10^{-9}$ to $10^{-7}$. On the other hand, where the electron beam EB is density-modulated as it is in the embodiment of the present invention, $\alpha \neq 1$ and the first term of the formula (6) remains. As a result, due to the primary effect of the mutual action, the high gain laser oscillation is attained even with the small current density I.

In the free-electron laser oscillator of the embodiment of the present invention, the wavelength limit of the laser oscillation appears in a short wavelength region, that is, a visible region. In a long wavelength region or an infrared region, the limit may be variable if the frequency difference $\Delta\omega = \omega_2 - \omega_1$ between the first laser beam $LB_1$ and the second laser beam $LB_2$, and the energy of the electron beam EB are properly set. On the other hand, the following two are considered to be causes of the oscillation limit in the short wavelength region. First, the spread of the electron in time of the photoelectron emission plane of the photoemitter 3, and second, the distortion of the electron beam EB due to a Coulomb's force among the emitted electrons.

In a known ultra-high speed light measurement streak camera, a time resolution of 400 femto seconds (fs) has been attained. The limit factor in this case is the Coulomb's force among the electrons in the second factor described above, and the spread in time on the photoelectron emission plane in the first factor is considered less than 100 fs. In the streak camera device, the electron beam is extracted as several pulses of 0.1 to 1A/cm$_2$ and 400 fs, the acceleration electric field on the photoelectric plane is in the order of 10 kV/mm, and the accelerated electrons are scanned at a constant velocity of several cm. The discussion of the time resolution in such a streak camera is described in "Time Resolution of an Image Converter Camera in Streak Operation" by V. V. Korobkin et al, the Journal of Photographic Science, Vol. 17, 1969. In the free-electron laser oscillator of the embodiment of the present invention, the electrons are accelerated even in an area where the electrons travel at a constant velocity in the streak camera because the velocity of the electrons is not sufficient if only the accelerated electric field is used. As a result, the density modulation of the electron beam is improved over that in the known streak camera. In the present invention, if the condition of $$1 - \alpha > (\hbar\omega_0)/(\gamma mc^2)$$

is met in formula (6), laser oscillation by the primary effect is attained. Accordingly, the oscillation at a fairly short wavelength is attained. Specifically, the oscillation up to the wavelength of 30 $\mu$m which corresponds to 100 fs is attained.

In the free-electron laser oscillator of the embodiment, the changes of the electron density from the photoelectron emission plane along the acceleration space direction x are shown in FIGS. 2B and 2C. FIG. 2B shows a case where the Coulomb's force among the electrons do not act greatly, that is, where the current is low. A density wave $E_{11}$ of the electrons immediately after the emission changes to a density wave $E_{12}$ as the electrons are accelerated. The density-modulated wavelength $\Delta x$ of the electron beam EB is expressed by $$\Delta x \simeq (2\pi v)/\Delta \omega$$

where v is the electron velocity. Assuming that $v \simeq c$, then $$\Delta x \simeq (2\pi c)/\Delta \omega \qquad (7)$$

The value $\Delta x$ is equal to the wavelength of the oscillated laser beam. FIG. 2C shows a case where the Coulomb's force among the electrons acts to deform the density wave of the electron beam EB. A density wave $E_{21}$ emitted from the photoelectric plane has the electron density thereof unified by the Coulomb's force as the electrons are accelerated, and changes to a density wave $E_{22}$. Accordingly, in the free-electron laser of the present invention, the limit of the short wavelength is determined by a response characteristic of the photoelectron emission plane to the laser beam. When the response characteristic is 100 fs, the wavelength limit is 100 fs×c(light velocity)=30 $\mu$m.

In the free-electron laser of the present invention, the electron emission material which forms the target of the photoemitter as the electron beam source may be selected from various materials so long as they have sufficient quantum efficiency, for example, 0.1 to 10 % for the laser beam irradiation. For example, ceciumantimony or gallium arcenide which has been widely used as well as a superconductive material may be used as the target material. A thermal cathode or an electric field radiation type cathode other than the photoemitter may be used as the electron beam source so long as they exhibit a sensitivity to the laser beam. For example, a dispenser cathode used for the thermal cathode has a quantum efficiency of 0.1 to 1% to an ultraviolet ray having a wavelength of 300 to 2000 nm. Thus, it may be used where the current density is in order of 0.1 to 1 A/cm$^2$.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

I claim:

1. A free electron laser oscillator comprising:
   a first laser beam generating means for emitting a first laser beam having a first wavelength;
   a second laser beam generating means for emitting a second laser beam having a second wavelength different from said first wavelength;
   an electron beam emission means for receiving a composition beam composed of said first and second laser beams and for converting said composition beam into an electron beam for emission;
   acceleration means for accelerating said electron beam to a predetermined speed at which said accelerated electron beam interacts with a light; and
   laser generating means for periodically biasing said accelerated electron beam with a predetermined cycle identical to a variation cycle in an electron density of said accelerated electron beam to generate a free-electron laser by the interaction between a synchrotron radiation light, obtained by the periodical biasing of said accelerated electron beam, and said accelerated electron beam.

2. A free-electron laser oscillator according to claim 1, further comprising light composition means for composing said first and second laser beams so as to form said composition light beam.

3. A free-electron laser oscillator according to claim 1, wherein said composition means comprises a light path conversion means for directing said first and second beams towards said electron beam emission means in the form of a single beam.

4. A free-electron laser oscillator according to claim 1, wherein said accelerating means comprises a magnet means for generating a periodic magnetic field, wherein a period of said magnetic field is set to be equal to the variation cycle in the electron density of said accelerated electron beam.

5. A method for comprising a free-electron laser beam comprising the steps of:
   combining two laser beams having different wavelengths to form a composition beam;
   irradiating said composition beam on an electron beam emission means which converts the incident composition laser beam into an electron beam for emission;
   accelerating the electron beam emitted from said electron beam emission means to a predetermined speed at which said accelerated electron beam interacts with a light; and
   periodically biasing said accelerated electron beam with a predetermined cycle identical to a variation cycle of an electron density of said accelerated electron beam to generate a free-electron laser.

* * * * *